United States Patent [19]

Friedman et al.

[11] 4,147,425
[45] Apr. 3, 1979

[54] PHOTOGRAPHIC PROCESSING ROLLER HAVING A SURFACE ROUGHENED BY ELECTRIC DISCHARGE MACHINING

[75] Inventors: Harvey S. Friedman, Natick; Irving S. Lippert, Lexington, both of Mass.; John W. Lothrop, Windham, N.H.

[73] Assignee: Polaroid Corporation, Cambridge, Mass.

[21] Appl. No.: 901,910

[22] Filed: May 1, 1978

[51] Int. Cl.² .............................................. G03D 9/02
[52] U.S. Cl. ...................................... 354/304; 354/86; 29/121.8; 219/69 R
[58] Field of Search ........................ 354/84, 85, 86, 87, 354/303, 304; 29/121.1, 121.8; 219/69 R, 69 M, 69 E

[56] References Cited

U.S. PATENT DOCUMENTS

| Re. 28,027 | 6/1974 | Bills et al. | 29/121.8 |
| 2,416,125 | 3/1945 | Simpson | 219/69 R |
| 3,398,253 | 8/1968 | Rye | 219/69 R |
| 3,410,980 | 11/1968 | Gugger et al. | 219/69 M |
| 3,447,221 | 6/1969 | Odiorne | 29/121.1 |
| 3,562,702 | 2/1971 | Celovsky | 219/69 R |
| 3,600,546 | 8/1971 | Toshio | 219/69 M |
| 3,766,842 | 10/1973 | Whall | 354/304 |
| 3,878,353 | 4/1975 | Anderson | 219/69 E |
| 3,941,970 | 3/1976 | Grow | 219/69 M |

Primary Examiner—L. T. Hix
Assistant Examiner—Alan Mathews
Attorney, Agent, or Firm—Frank J. Caufield

[57] ABSTRACT

An improved cylindrical processing roller is provided for use in a motor driven photographic processing apparatus of the type which spreads a fluid processing composition in a thin, substantially uniform layer between selected layers of integral type self-processable film units while advancing a film unit to the exterior of a camera after photoexposure. The improvement in the roller resides in a novel circumferential roller surface roughened by electrical discharge machining techniques to provide the roller with a high-friction characteristic for transporting the film units while being insufficiently rough to leave any visually perceptible marks on a film unit.

9 Claims, 4 Drawing Figures

PHOTOGRAPHIC PROCESSING ROLLER HAVING A SURFACE ROUGHENED BY ELECTRIC DISCHARGE MACHINING

BACKGROUND OF THE INVENTION

1. Field of the Invention

This invention in general relates to photographic apparatus and in particular to improved cylindrical processing rollers for use in motor driven photographic processing apparatus of the type which spread a fluid processing composition in a thin, substantially uniform layer between selected layers of integral type, self-processable film units while advancing a film unit to the exterior of a camera after photoexposure.

2. Description of the Prior Art

Fully automatic photographic cameras which utilize integral type self-processable film units are well-known in the photographic field, having been extensively described in the patent literature and in public use for several years now. These cameras, such as Polaroid Corporation's "SX-70" and "Pronto!" and Eastman Kodak Company's "EK-6" and "EK-8" cameras, are designed to automatically produce furnished, waste-free color prints with virtually no operator involvement other than to compose the picture, perhaps focus, and then actuate the camera by depressing its cycle "start" button.

They accomplish this task through the use of specially designed interdependent function providing subsystems that are organized to carry out a programmed series of sequential operations which produce the finished print.

Once actuated, the order of camera operations begins with exposure of a film unit. Afterwards, the exposed film unit is advanced from its exposure location into engagement with a film processing subsystem or apparatus which initiates a diffusion transfer process for developing and forming a visible image in the film unit while transporting it to the exterior of the camera where it becomes accessible to the photographer.

The film units, as for example those described in considerable detail in U.S. Pat. Nos. 3,415,644; 3,594,165; and 3,761,268, normally contain all the photographic components necessary for the diffusion transfer process. Typically, the film units comprise, in general terms, a pair of superposed sheet elements, at least one being transparent, which serve to support layers of photochemical substances which may comprise photosensitive and image-receiving layers; and, as well, include a rupturable container of viscous processing fluid positioned adjacent a leading edge of the film unit and adapted to have its processing fluid released between the sheet elements to begin the diffusion transfer process. Release of the processing fluid is effected by the processing apparatus which first operates to rupture the container and thereafter causes the released mass of processing fluid to flow between the sheet elements, opposite the direction of travel of the film unit, so that the processing fluid is progressively deposited between the sheet elements as a thin, uniform layer generally coextensive with the exposed area of the film unit. Upon completion of the diffusion transfer process, the final image is viewable through the sheet element which is transparent.

Photographic processing apparatus having the capability of performing the film advancing and fluid spreading operations outlined above are well-known in the art. Generally, such apparatus comprise a pair of rollers rotatably mounted in juxtaposed relation and resiliently urged toward one another to exert a pressure on the film unit as it is advanced between them in response to rotation of at least one of the rollers by a motor drive. The rollers typically are manufactured to precision tolerances so that the fluid layer thickness is properly sized for optimum photographic image quality and at least one of them is provided with a high-friction, sheet-contacting surface to provide a high traction force to transport the film unit to the outside of the camera without slippage and without visibly damaging the surfaces of the film unit.

In addition to the precision tolerances and the high-friction, low-abrasion surface characteristic, these rollers must also possess high strength so that they either won't deform under the pressures generated during processing or deform only in a predictable manner, have high corrosion resistance, and be capable of retaining their original geometry after having processed a number of film units related to their expected useful life.

Changes in initial roller geometry can occur by a build up of particulate matter from the film units which is picked up by the roller's surfaces. Thus, a further design requirement on these type of rollers is that they do not pick up particulate matter.

One prior art device which satisfies the functional criteria for such film processing apparatus is described in considerable detail in U.S. Pat. No. 3,776,118 issued to John J. Driscoll et. al. on Dec. 4, 1973 and entitled "Photographic Film Processing Apparatus". Here the processing apparatus includes a roller assembly having first and second rotatably mounted juxtaposed elongated rollers which are resiliently urged toward one another. A pair of annular collars are provided on the first roller to define a minimum gap between the rollers to facilitate the initial introduction of the leading edge of a film unit between the rollers. The first roller is adapted to be selectively driven by a motor of the camera and, when so driven, its annular collars impart a rotary motion to the second roller. At least those portions of the two rollers adapted to contact one another are formed of a relatively low friction, impact resistant material, such as stainless steel, while at least the sheet-contacting facing surface of the first roller is formed of a relatively high friction material such as urethane. The urethane which is coated on the first roller operates to provide the relatively high traction force between the first roller and the film unit to transport the film unit outside of the camera and the stainless steel provides the strength necessary to withstand the pressures generated during the transport and fluid spreading phases. In addition to its strength, the stainless steel also possesses desirable corrosion resistant characteristics.

Although the performance of this type device is more than adequate as evidenced by its success in Polaroid Corporation's "SX-70" and "Pronto!" cameras, it is, as one would expect from its design criteria, relatively expensive to manufacture. The urethane coating coupled with the precision tolerances in particular represent a major portion of its cost.

Another motor driven processing apparatus is that used in Eastman Kodak Company's "EK-6" and "EK-8" cameras. Here both rollers, which appear to be surfacehardened steel, are motor driven and each has a roughened surface to provide the high traction force necessary for film transport. It appears that the roughened surfaces of these rollers may be achieved by conventional crush grinding techniques and may afterwards be plated for corrosion protection and wear resistance. The roughened surfaces of these rollers would also appear to be relatively expensive to manufacture.

Consequently, there is a need for an improved, less expensive, photographic processing roller which can be used with integral type, self-processable film units. Thus, it is a primary object of the present invention to provide such a roller by using electrical discharge machining (EDM) techniques to texture its surface to achieve the high-friction, low-abrasion surface required of these type rollers.

It is recognized that EDM textured roller surfaces have been used extensively in the steel industry for the purpose of texturing sheet steel (U.S. Pat. Nos. 3,878,353; 3,800,117; and Re 28,027) and that EDM also has been used to increase the friction of rolls used to feed strip stock (U.S. Pat. No. 3,941,970). However, the EDM textured rollers disclosed above are not appropriate for use with self-processable film. Therefore, it is another object of the present invention to provide an improved photographic processing roller having a particular EDM surface which is suitable for use with self-processable film units.

Other objects of the invention will in part be obvious and will in part appear hereinafter. The invention accordingly comprises the apparatus possessing the construction, combination of elements and arrangement of parts which are exemplified in the following detailed disclosure.

SUMMARY OF THE INVENTION

This invention, in general, relates to photographic apparatus and in particular to an improved cylindrical processing roller for use in a motor driven photographic processing apparatus of the type for advancing an integral type self-processable film unit to the exterior of a camera while simultaneously spreading a fluid processing composition between selected layers of the film unit and of the type having a circumferential surface of given length machined to a precision diameter to facilitate spreading the fluid processing composition in a substantially uniform thin layer between the film unit's selected layers. The improvement comprises a plurality of generally spaced apart, substantially uniform sized and shaped microscopic craters formed along a predetermined length of the roller's surface by electrical discharge machining. The craters cover no more than 50 percent of the area of the predetermined surface length and each is surrounded by a substantially uniform annular lip which extends above the surface by an amount insufficient to mark the film unit's surfaces. Each annular lip has a volume which generally equals the volume of the depressed portion of the crater which is below the surface. The roller surface is thus configured to provide the roller with a high-friction characteristic for transporting a film unit while being insufficiently rough to leave any visually perceptible marks on a film unit's surfaces, to minimize pickup of particulate matter from the film unit which would otherwise build up and reduce the high-friction characteristic, and to maintain the effectiveness of the roller's precision diameter so that substantially no change in its fluid spreading performance results from the presence of the craters.

In the illustrated embodiment of the improved roller, the mean diameter of the microscopic craters is 0.0014 inches and the mean height of each crater's annular lip, above the surface, is 0.00016 inches. Also, the mean number of microscopic craters per square inch is 80,000 so that the craters cover between 10 and 20 percent of the area of the predetermined surface length.

DESCRIPTION OF THE DRAWINGS

The novel features that are considered characteristic of the invention are set forth with particularity in the appended claims. The invention itself, however, both as to its organization and method of operation together with other objects and advantages thereof will best be understood from the following description of the illustrated embodiment when read in connection with the accompanying drawings wherein like numbers have been employed in the different figures to denote the same parts and wherein:

DESCRIPTION OF THE PREFERRED EMBODIMENT

Figure 1:
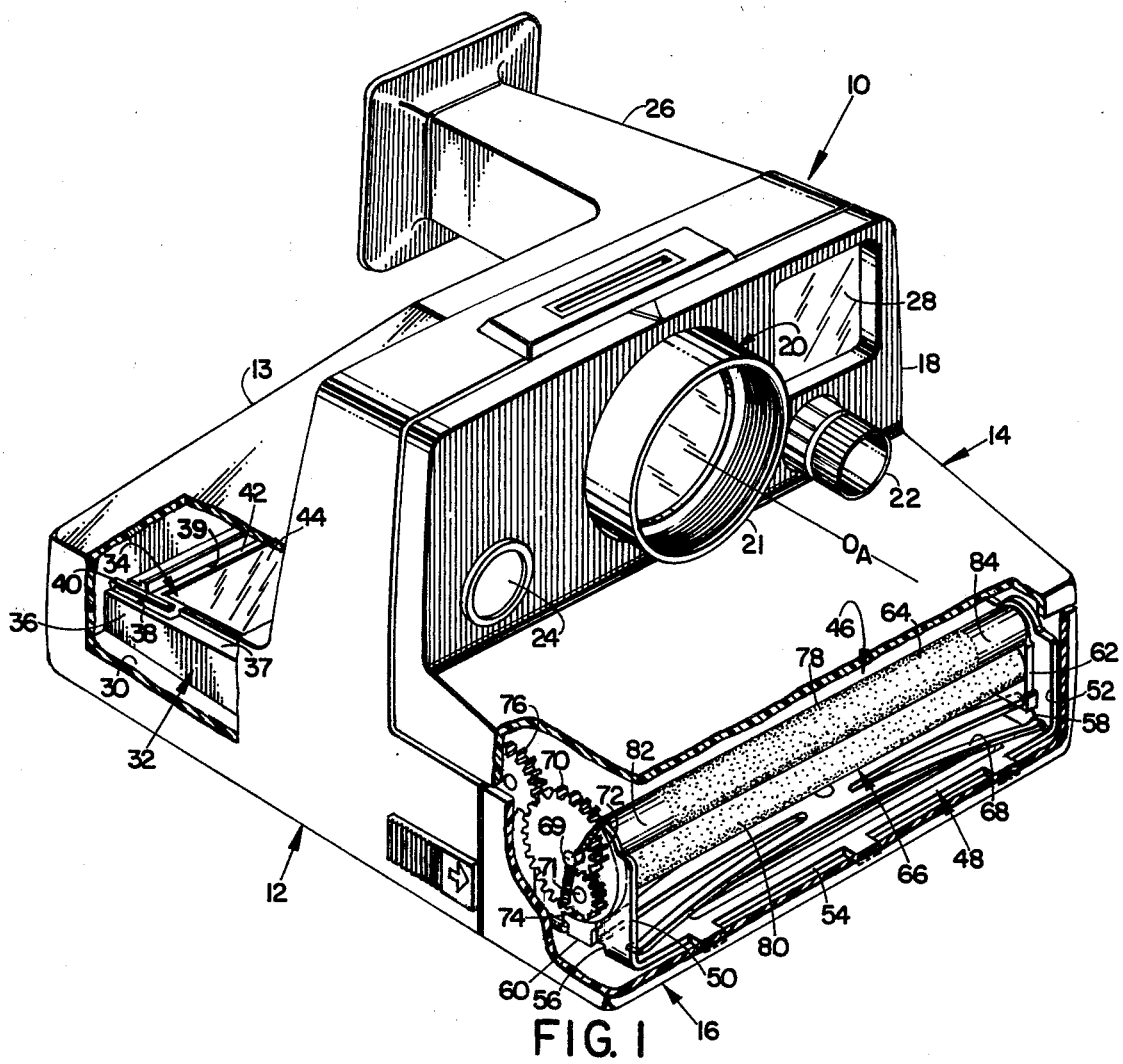
FIG. 1 is a perspective view, with parts broken away, of a self-processable type camera embodying the present invention.

Referring now to FIG. 1, there is shown a fully automatic camera 10 of the type which uses integral, self-processable film units and in which the improved photographic processing roller of the present invention is incorporated.

The camera 10 comprises a body 12, a front cover 14, and a door 16 which interconnect to define its outward appearance and serve as a protective enclosure for housing the camera's interior components.

Located in a vertical forward wall 18 of the front cover 14 is an objective taking lens 20 having an optical axis, OA, therethrough. The objective taking lens 20 may be a Cooke Triplet or similar multi-element type of lens which can have its focal length changed by adjusting the axial air spacing between its optical elements. This may be accomplished in a well-known manner by rotating a bezel, such as that designated at 21, which extends through an opening in the front cover 14 and is coupled with a screw-threaded lens mount (not shown).

Formed in the base of the body 12 is a well-known film cassette receiving chamber 30 which is adapted to releasably hold a film cassette such as that designated at 32. The cassette 32 comprises a generally rectangular parallelepiped housing 36 which has an upwardly facing wall 37 having a generally rectangular aperture 39 therein. Mounted in registration with and biased toward the aperture 39 is a stacked array of integral type self-processable film units generally designated at 34. Underneath the stacked array of film units 34 is a flat, thin battery (not shown) which may be used to supply power to the various electrical components of the camera 10.

Each film unit 34 comprises a pair of superposed sheet elements including a top transparent sheet 44, preferably formed of mylar, beneath which is a bottom sheet that is not shown. Positioned adjacent the leading edges of the film unit's sheet elements is a rupturable container of viscous processing fluid or composition (not shown) adapted to have its contents spread between the film unit's sheet elements to effect a diffusion transfer process after photoexposure.

Each film unit's sheet elements, and the rupturable container are bound together by a binding element 42 which overlaps their lateral edges and has portions adhered to their outwardly facing surfaces. The peripheral edges of the binding element 42 which terminate on the outer surfaces of the transparent sheet 44 are generally coextensive with the aperture 39 of the film cassette 32 and as such define the area of each film unit 34 which may be exposed through the top transparent sheet 44. Also the longitudinal edges of the film unit's sheet elements which are bound by the element 42 operate in a well-known manner to at least in part define the thickness of the layer of processing fluid which can be spread between the film unit's sheet elements.

An example of such a film cassette is described in considerable detail in U.S. Pat. No. 3,872,487 issued to Nicholas Gold on March 18, 1975 and entitled "Photographic Film Assemblage and Apparatus" and of such film units in previously mentioned U.S. Pat. Nos. 3,415,644; 3,594,165; and 3,761,268.

The body 12 also includes a generally planar rear wall 13 slanted at a predetermined angle with respect to both the film cassette 32 and the optical axis, OA, of the objective taking lens 20. Attached to the interior of the rear wall 13, but not shown, is a trapezoidalshaped mirror positioned along the optical axis, OA, intersecting it at a predetermined angle, to provide a folded optical path between the objective taking lens 20 and the forwardmost one of the stacked array of film units 34. With this optical arrangement, rays from a scene which emerge from the objective taking lens 20 are reflected from the mirror toward the film units 34.

Exposure of the film units 34 is regulated automatically by a well-known exposure control system which is located, but not shown, behind the front cover's vertical forward wall 18.

Located to the right of the objective taking lens 20 in an optical system 22 which is used to direct scene light to a photodetector (not shown) which forms part of the camera's exposure control system.

To the left of the objective taking lens 20 is a camera start button 24 which, when actuated, initiates, in a well-known manner, a camera operating cycle.

Once a camera operating cycle is initiated, photoexposure of a forwardmost one of the film units 34 is effected in the manner previously outlined. The photoexposed film unit is then advanced toward the forward end of the camera 10 where it is brought into engagement with a film processing apparatus 46 which includes improved rollers according to the present invention.

Advancement of a photoexposed film unit 34 is accomplished via a pick member 40 which fits a slot 38 of the film cassette housing 36 and engages a portion of the film unit's trailing edge. The pick member 34 is actuated by a well-known film advancing apparatus to which it is attached to move toward the processing apparatus 46 a predetermined distance while pulling a photoexposed film unit 34 along with it.

Such a film advancing arrangement is described in considerable detail in, for example, U.S. Pat. No. 3,047,192 issued to Bruce K. Johnson et. al. on Sept. 6, 1977 and entitled "Photographic Apparatus With Sequencing System".

The film processing apparatus 46 is mounted in a well-known manner on the door 16 to pivot downwardly thereby providing access to the film cassette receiving chamber 30 so that the film cassette 32 can be loaded or removed therefrom. As an example of this arrangement, reference may be had to U.S. Pat. No. 3,974,510 issued to Andrew S. Ivester on Aug. 10, 1976 and entitled "Mounting Apparatus for a Spreader Roller Assembly".

The processing apparatus 46 comprises a "U"-shaped support bracket 48 which includes a base 54 attached to the door 16. The base 54 has two spaced apart vertical legs, 50 and 52, depending upwardly therefrom. Formed in each vertical leg, 50 and 52, are vertically oriented slots, 56 and 58, respectively. Slidably disposed in each vertical slot, 56 and 58, are complementary configured bearing blocks, 60 and 62, respectively, in which are mounted for rotation the journals of a cylindrical bottom roller 66. The bottom roller 66 thus arranged can rotate with respect to the bearing blocks, 60 and 62, while the bearing blocks, 60 and 62, can slide up or down in their respective slots, 56 and 58.

Opposed end portions of a bow-shaped spring 68 engage, respectively, the bottoms of the bearing blocks, 60 and 62, to resiliently urge the roller 66 upwardly.

Rotatably mounted above the bottom roller 66 is a top roller 64 whose journals fit complementary shaped bearings (not shown) which are pressed into the upper end of the vertical legs 50 and 52. In this manner, the rollers 64 and 66 are rotatably mounted in juxtaposed relationship to define a pressure generating gap between them through which a film unit 34 can be advanced by rotating the rollers, 64 and 66, in a manner to be described.

Fixedly mounted on a journal 69 of the top roller 64 is a compound spur gear comprising a gear 70 meshed with a pinion gear 76 and a gear 72 meshed with a gear 74 which is fixedly attached to a journal 71 of the bottom roller 66.

The pinion gear 76 is driven by a well-known motor powered gear train (not shown) to cause the rollers 64 and 66 to rotate, via the gearing arrangement outlined, to advance a photoexposed film unit 34 to the exterior of the camera 10 while spreading its self-contained processing fluid in a substantially uniform thin layer between its sheet elements.

Such a gearing arrangement is described in detail, for example, in U.S. Pat. No. 4,051,492 issued to Irving Laskin et. al. on Sept. 27, 1977 and entitled "Photographic Apparatus Gear Train Having a Unique Set of Gears".

The cylindrical processing rollers, 64 and 66, are preferably formed of stainless steel and have their circumferential surfaces machined to a precision diameter (tolerances held to a few tenths of a mil) to facilitate spreading of the film unit's processing fluid.

As seen in FIG. 1, the circumferential surfaces of each roller, 64 and 66, are provided with the invention's improved roughened surfaces, 78 and 80, respectively, to provide them with a high-friction characteristic for transporting film units 34 without leaving any visually perceptible marks on them, particularly their transparent mylar top sheets 44.

Figure 2:
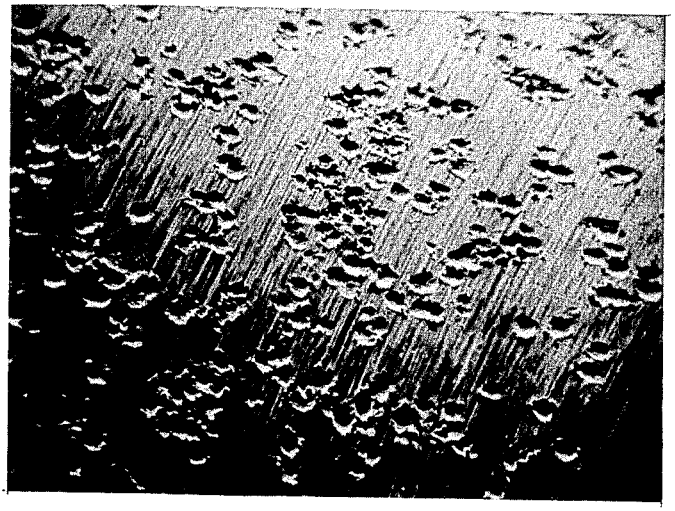
FIG. 2 is a photograph of the surface of the processing roller of the invention at 100 magnification.
Figure 3:
FIG. 3 is another photograph of the surface of the processing roller of the invention except at 1000 magnification.

The improved roughened surfaces, 78 and 80, as best seen in FIGS. 2 and 3, comprise a plurality of generally spaced apart, substantially uniform sized and shaped microscopic craters formed along a predetermined length of each roller's circumferential surface by electrical discharge machining in a manner to be described.

The top roller's improved surface 78 is centrally disposed along its full length leaving a pair of spaced apart smooth end sections, 82 and 84, which are unroughened (no craters) so as to reduce the possibility of picking up particulate matter from the film units 34, particularly from their masked longitudinal edges over which the end sections, 82 and 84, ride while the film units 34 are transported between the rollers, 64 and 66.

However, the bottom roller's roughened surface 80 extends across the entire length of the bottom roller's circumferential surface.

The craters, as can be seen in FIG. 2, preferably cover between 10 and 20 percent of the area corresponding to the predetermined length of the roller's circumferential surfaces over which they extend. However, the craters may cover a higher percentage of area and still be operative but should not exceed 50 percent area coverage.

Each crater, as best seen in FIG. 3, is surrounded by a substantially uniform annular lip which extends above its corresponding roller's smooth (uncratered or untextured) surface. The volume of each crater's annular lip generally equals the volume of the "bowl" shaped portion of the crater which is below the roller's smooth surface. Thus, each crater's annular lip represents a mass of stainless steel formed generally by displacing material with a minimum stock removal.

The height to which each annular lip extends above the smooth roller surface is chosen so that it provides an increase in friction compared to the unroughened roller. However, the lip height is not so high as to cause visually percetible marks in the film units 32.

For Polaroid Corporation's "SX-70 Land" type film, it has been found that the lip height should not exceed 0.00035 inches. However, the preferred mean lip height for the embodiment illustrated is 0.00016 inches with a standard deviation of 0.00006 inches.

The mean diameter of the craters of the illustrated embodiment is 0.0014 inches with a standard deviation of 0.0004 inches, the mean number of craters per square inch of surface area of the illustrated embodiment is 80,000 and its surface roughness as measured with a standardized profilometer (Bendix Model S-48 Proficorder) is between 40 and 60 microinches/inch (AA).

Structured in this manner, the improved roughened surfaces, 78 and 80, of the rollers, 64 and 66, respectively not only are provided with a high-friction, low-abrasion characteristic but, as well, are configured to minimize pick up of particulate matter from the film units 34 and to maintain the effectiveness of each roller's precision diameter so that substantially no change in its fluid spreading performance results from the presence of the craters.

It is important that the craters be generally spaced apart to minimize pickup of particulate matter from the film units. If build up of particulate matter were to occur, the high-friction characteristic gained by the addition of the craters would be reduced thereby defeating their purpose. An additional problem caused by build up is a change in the roller's precision diameter causing it to have an effective diameter larger than intended. The effective diameter can also change if too many craters are applied to the roller's surface, i.e. more than 50% by area coverage, and are spaced too close together.

Figure 4:
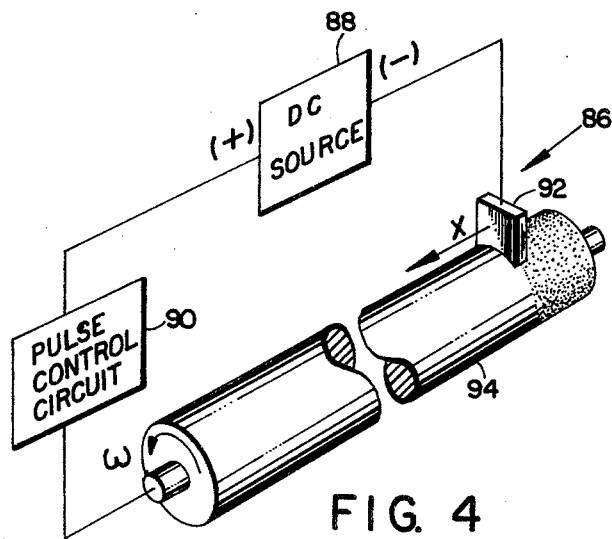
FIG. 4 is a diagrammatic perspective view of apparatus by which the roller surface of the invention can be formed.

An electrical discharge machining apparatus 86 by which the craters can be formed in the roller's circumferential surfaces according to the criteria outlined above is diagrammatically illustrated in FIG. 4 to which reference is now made.

A roller 94 is mounted for rotation at a controlled angular speed. The roller is coupled to the positive end of a D.C. source 88 via a conventional EDM pulse control circuit 90 while the negative end of the D.C. source is coupled to an electrode 92. The electrode 92 is mounted for controllable movement along the length of the roller 94 and toward its surface to establish a gap between the electrode and roller surface. This may be accomplished in a well-known manner as, for example, by using a servomechanism designed for this purpose. The electrode 92 as shown is shaped to the roller's surface covering only a fraction of its circumference and is also substantially narrow compared to the roller's length. As is well-known the roller 94 and electrode 92 are immersed in a suitable dielectric fluid to effect the EDM process.

With the apparatus 86, the roller is rotated at a fixed angular speed after which the electrode 92 is moved along its length at a fixed linear velocity in the direction, X, traversing the roller's length from end to end just once.

During the electrode traverse, the craters are randomly formed on the roller's surface in a generally spaced apart relationship. The actual size, depth and distribution of the craters depends, of course, on such parameters as electrode to surface gap, power transferred during arc discharge, duration of arc discharge, polarity of the electrode and roller, and the relative movement of the electrode with respect to the roller surface.

The surface of the illustrated embodiment, for example, was achieved by rotating the roller (approximately ¼ inch diameter) at 1850 RPM while moving a 1/16" wide electrode across its length at a rate of 0.9 inches/second. Power was set at 7.5 amp. $\mu$sec. and pulsed on and off every 10.0 microseconds—5 microseconds on and then —5.0 microseconds off. The initial surface finish of the uncratered roller was generally less than 16 microinches/inch (AA).

Certain changes may be made in the above described embodiment without departing from the scope of the invention, and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. In an improved cylindrical processing roller for use in a motor driven photographic processing apparatus of the type for advancing an integral type self-processable film unit to the exterior of a camera while simultaneously spreading a fluid processing composition between selected layers of the film unit and of the type having a circumferential surface of given length machined to a precision diameter to facilitate spreading the fluid processing composition in a substantially uniform thin layer between the film unit's selected layers, the improvement comprising a plurality of generally spaced apart, substantially uniform sized and shaped microscopic craters formed along a predetermined length of said surface by transferring to said predetermined length of said surface a plurality of high energy pulses each of which contains sufficient energy to locally melt said surface thereby creating individual ones of said craters, said craters covering no more than 50 percent of the area of said predetermined surface length and each being surrounded by a substantially uniform annular lip which extends above said surface by an amount insufficient to mark the film unit's surface and has a volume which generally equals the volume of the depressed portion of the crater which is below said surface, said roller surface being thus configured to provide said roller with a high-friction characteristic for transporting a film unit while being insufficiently rough to leave any visually perceptible marks on a film unit's surface, to minimize pickup of particulate matter from the film unit which would otherwise build up and reduce said high-friction characteristic, and to maintain the effectiveness of said roller's precision diameter so that substantially no change in its fluid spreading performance results from the presence of said craters.

2. The improved roller of claim 1 wherein the mean diameter of said microscopic craters is 0.0014 inches and the mean height of said crater's annular lip above said surface is 0.00016 inches.

3. The improved roller of claim 1 wherein the maximum height to which said lips of said craters extend above said surface does not exceed 0.00035 inches.

4. The improved roller of claim 2 wherein the mean number of said microscopic craters per square inch is 80,000 so that said craters cover between 10 and 20 percent of said surface's total area.

5. The improved roller of claims 1 or 4 wherein said microscopic craters are randomly spaced apart with respect to one another.

6. the improved roller of claims 1 or 4 wherein said roller's surface has a finish within the range of 40 to 60 microinches per inch (AA).

7. The improved roller of claim 1 wherein said roller is fabricated of stainless steel.

8. The improved roller of claim 1 wherein said predetermined length of said roller's surface is centrally disposed along said roller's given length.

9. The improved roller of claim 1 wherein said craters are formed by electrical discharge machining.

* * * * *